(12) United States Patent
Miller et al.

(10) Patent No.: US 8,313,275 B2
(45) Date of Patent: Nov. 20, 2012

(54) WEDGE FASTENER

(75) Inventors: David E. Miller, Cincinnati, OH (US); Scott W. Allen, Aurora, IN (US)

(73) Assignee: Ohio Valley Precision, Inc., Lawrenceburg, IN (US)

( * ) Notice: Subject to any disclaimer, the term of this patent is extended or adjusted under 35 U.S.C. 154(b) by 302 days.

(21) Appl. No.: 12/855,947

(22) Filed: Aug. 13, 2010

(65) Prior Publication Data

US 2012/0039686 A1    Feb. 16, 2012

(51) Int. Cl.
*F16B 21/00* (2006.01)
(52) U.S. Cl. .................... 411/355; 403/379.4
(58) Field of Classification Search .............. 411/354, 411/355, 80; 403/379.4
See application file for complete search history.

(56) References Cited

U.S. PATENT DOCUMENTS

| | | | |
|---|---|---|---|
| 415,711 A * | 11/1889 | Galbreath | 411/347 |
| 423,560 A * | 3/1890 | Hutchinson | 238/253 |
| 490,176 A | 1/1893 | Stetson | |
| 1,037,091 A | 8/1912 | Wedge | |
| 1,103,403 A | 7/1914 | Duckworth | |
| 1,244,499 A | 10/1917 | Hibbard | |
| 1,250,003 A * | 12/1917 | Phenice | 403/396 |
| 1,487,184 A * | 3/1924 | Saunier | 411/354 |
| 1,552,200 A | 9/1925 | Benish | |
| 1,682,740 A | 9/1928 | Colt | |
| 1,815,098 A * | 7/1931 | Earhart | 411/355 |
| 2,676,063 A | 4/1954 | Whitt | |
| 4,184,665 A | 1/1980 | Queen, Jr. | |
| 4,240,322 A | 12/1980 | Teske | |
| 4,295,752 A | 10/1981 | Lerch | |
| 4,367,053 A | 1/1983 | Stratienko et al. | |
| 4,411,550 A | 10/1983 | Schutt et al. | |
| 4,508,479 A | 4/1985 | Mez | |
| 4,576,504 A * | 3/1986 | Hartman | 403/318 |
| 4,846,615 A | 7/1989 | Forsyth | |
| 5,131,789 A | 7/1992 | Raty | |
| 5,277,323 A | 1/1994 | Wallace et al. | |
| 5,344,252 A | 9/1994 | Kakimoto | |
| 5,639,176 A | 6/1997 | Mullenberg | |
| 5,902,066 A | 5/1999 | Griffen et al. | |
| 5,964,547 A | 10/1999 | Brinkley | |
| 6,905,106 B2 | 6/2005 | Myers et al. | |

OTHER PUBLICATIONS

Baggett et al, U.S. Statutory Invention Registration No. H906, published Apr. 2, 1991.

* cited by examiner

*Primary Examiner* — Flemming Saether (74) *Attorney, Agent, or Firm* — Wood, Herron & Evans, LLP (57) ABSTRACT

A wedge fastener configured for use in extreme ambient conditions includes a pin or bolt having a head and a shank with an elongate slot through the shank. The wedge fastener also includes a wedge sized so that at least a portion of the wedge may extend through the elongate slot to grip a flange between the head and the wedge. The wedge fastener also includes a locking mechanism for locking the wedge in a gripping position against the flange. In one example, the locking mechanism includes locking keys with angled ridges configured to slide in angled slots on the wedge until the locking keys engage the shank. In another example, the locking mechanism includes a jack plate attached to the wedge and adjustment screws for engaging the shank to pull the wedge through the elongate slot.

11 Claims, 8 Drawing Sheets

WEDGE FASTENER

TECHNICAL FIELD

This invention generally relates to fasteners and more particularly to wedge fasteners configured for use in extreme ambient conditions such as high temperatures or corrosive environments.

BACKGROUND

The use of conventional fasteners to couple multiple elements of a system together is well-known. However, conventional fasteners such as a threaded bolt and nut combination tend to fail in extreme ambient conditions. For example, a steel mill or foundry typically has extreme ambient conditions because the mechanical devices such as steel pots for holding molten steel must withstand extremely high temperatures and highly corrosive environment while forming and working with molten steel. Generally, the steel pot is coupled to a support cradle that supports and drives the steel pot to tip and pour out molten steel when required. A funnel-like lid is often coupled to the steel pot to enable accurate pouring of molten steel. Each of the lid and the support cradle are coupled to the steel pot conventionally with threaded bolts and double nuts. The threaded bolts and double nuts are generally successful in keeping these elements fastened together.

However, in the extreme high temperatures and corrosive environment around the steel pot, the bolts and double nuts tend to fuse to one another or corrode to a point where the nuts are no longer removable from the threaded bolts. Consequently, when the lid needs to be removed from the steel pot or the steel pot needs to be removed from the cradle, the bolts must be removed with a cutting torch. The conventional threaded bolts used for both connections are at least 4 inches in diameter, and cutting through 4 inch bolts takes a significant amount of time and energy. Consequently, the steel pot must be taken out of commission for a significant period of downtime nearly every time the lid or the cradle is disconnected from the steel pot. Additionally, this deficiency has led some steel mill operators to use a minimum number of conventional fasteners to couple these elements together, which can lead to serious safety hazards if any of the fasteners fails in operation.

Therefore, it would be desirable to improve the fasteners used in such extreme ambient conditions and address some of the problems with conventional fasteners.

SUMMARY

According to one embodiment of the present invention, a fastener configured to couple two flanges together includes a pin having a head and an elongate shank extending from the head to a lower end. The shank includes an elongate slot disposed between the head and the lower end. The fastener further includes a wedge sized so that at least a portion of the wedge may extend through the elongate slot. The wedge includes an upper surface, a lower surface, and first and second side surfaces that increase in with as defined between the upper surface and the lower surface along a longitudinal length of the wedge. The wedge further includes a longitudinal slot extending between the first and second side surfaces and a plurality of angled slots formed in at least one of the side surfaces adjacent to the longitudinal slot.

The fastener further includes at least one locking key adapted to engage the wedge when the wedge is inserted through the elongate slot. The locking key includes an inner surface facing the wedge, an outer surface, and an end surface facing the shank of the pin. The locking key further includes a transverse slot extending between the inner surface and the outer surface. The inner surface of the at least on locking key includes a plurality of angled ridges adjacent to the transverse slot and configured to engage the plurality of angled slots in the at least one side surface of the wedge. The fastener further includes a locking bolt inserted through the longitudinal slot of the wedge and the transverse slot of the at least one locking key. When the wedge is slide through the elongate slot in the shank the two flanges are gripped between the head of the pin and the upper surface of the wedge, the at least one locking key is engaged with the at least one side surface of the wedge such that the angled slots and angled ridges engage. The locking key is then slide upwardly until the end surface engages the shank adjacent to the elongate slot, and then the locking bolt is tightened to the wedge and the locking key to hold the wedge in position.

According to another embodiment of the invention, a method of coupling two flanges with a fastener includes inserting a shank of a pin through the two flanges. The method further includes sliding a wedge through an elongate slot in the shank until the two flanges are gripped between a head of the pin and the wedge. The wedge is locked into position by engaging a locking key with the wedge and the shank. The method also includes tightening a locking bolt onto the wedge and the locking key to prevent movement of the wedge.

In yet another embodiment of the invention, a fastener configured to couple a slotted flange and a support member includes a swing bolt having a head at a first end configured to pivotally engage the support member. The swing bolt also includes a shank extending from the head to a second end, the shank including an elongate slot configured to be disposed at least partially above the slotted flange when the shank is inserted into the slotted flange. The fastener further includes a wedge sized so that at least a portion of the wedge may extend through the elongate slot. The wedge includes an upper side surface, a lower side surface, and a width between the upper and lower side surfaces that increases from a first end to a second end. The first end includes a threaded bore. The fastener of this embodiment further includes a jack plate including at least one threaded coupling bolt configured to engage the threaded bore in the wedge. The wedge fastener also includes two adjustment bolts engaged with the jack plate on opposing sides of the wedge. The adjustment bolts may be tightened against the shank to pull at least a portion of the wedge through the elongate slot until the wedge urges the slotted flange toward the support member.

According to another embodiment of the invention, a method of coupling a slotted flange to a support structure with a fastener includes coupling a head of a swing bolt to pivotally engage the support structure, and pivoting the swing bolt to swing a shank into the slotted flange. The method also includes sliding at least a portion of a wedge through an elongate slot in the shank until the slotted flange is gripped by the wedge. The method further includes coupling a jack plate to the wedge, and tightening adjustment bolts into engagement with the shank to pull at least a portion of the wedge through the elongate slot.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention. Like reference numerals are used to indicate like parts throughout the various figures of the drawing, wherein.

DETAILED DESCRIPTION

Figure 1:
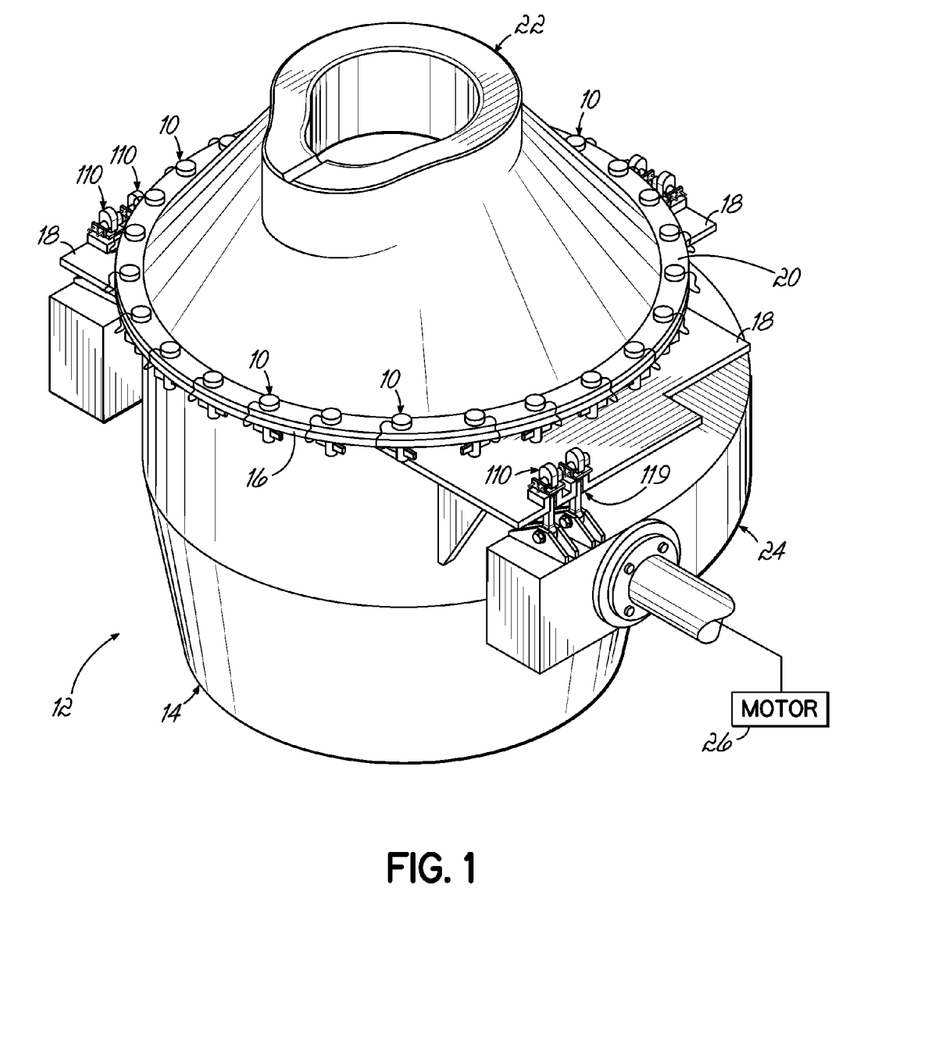
FIG. 1 is a perspective view of a steel pot coupled to a funnel-like lid with a first embodiment of a wedge fastener according to the invention, and further coupled to a support cradle with a second embodiment of a wedge fastener according to the invention.

Referring to FIG. 1, a steel pot 12 using a first embodiment of a wedge fastener 10 and a second embodiment of a wedge fastener 110 according to the invention is shown. The steel pot 12 is used to hold and pour molten steel in a steel mill or foundry, as understood in the art. The steel pot 12 includes a main body 14 in the shape of a bowl having a top edge flange 16 and a slotted support flange 18 below the top edge flange 16. The top edge flange 16 is configured to be coupled with a bottom edge flange 20 of a funnel-like lid 22 coupled to the steel pot 12 to provide more controlled pouring. The top edge flange 16 and bottom edge flange 20 include a plurality of apertures (not shown) in registration with each other, each aperture configured to receive the wedge fastener 10. In the illustrated example, twenty-five of the wedge fasteners 10 are used around the periphery of the steel pot 12 and the lid 22.

The slotted support flange 18 is configured to be coupled to a support structure or cradle 24 with the wedge fasteners 110 of the second embodiment, described in further detail below. The support cradle 24 is also coupled to a motor 26 for driving the support cradle 24 to rotate and tip the steel pot 12 when molten steel is to be poured from the steel pot 12. The wedge fasteners 10, 110 are configured to hold the steel pot 12 and lid 22 without fusing of large fastening elements as experienced with conventional fasteners. Because of the extreme ambient conditions around the steel pot 12, the wedge fasteners 10, 110 are advantageously made from steel capable of withstanding high temperatures and corrosive environments, such as 4140 or 4340 steel.

FIGS. 2-7 further illustrate details of wedge fastener 10. With specific reference to FIGS. 2 and 3, the wedge fastener 10 includes a pin 28 having a head 30 and a generally cylindrical shank 32 extending downwardly from a bottom side 34 of the head 30 to a lower end 36. The bottom side 34 of the head 30 is configured to seat on the bottom edge flange 20 of the lid 22 when the shank 32 is disposed through apertures in the bottom edge flange 20 of the lid 22 and the top edge flange 16 of the steel pot 12. The shank 32 further includes an elongate slot 38 cut through the center of the shank 32 proximate to the lower end 36. The elongate slot 38 includes generally parallel sidewalls 40a, 40b and concave ends 42a, 42b. The concave ends 42a, 42b may have a tapered contour configured to engage the corresponding tapered profile of a wedge 46, as described in further detail below. The shank 32 may also be milled along one side adjacent to the elongate slot 38 to form a planar surface 44 surrounding the elongate slot 38.

The wedge fastener 10 further includes a wedge 46. With specific reference to FIGS. 3 and 6, the wedge 46 includes an upper surface 48, a lower surface 50, a first side surface 52, a second side surface 54, a small end surface 56, and a large end surface 58. The upper surface 48 and lower surface 50 diverge away from each other in a longitudinal direction from the small end surface 56 to the large end surface 58, such that the width of the wedge 46 and the side surfaces 52, 54 increases along the longitudinal length of the wedge 46. The wedge 46 is sized so that at least a portion of the wedge may extend through the elongate slot 38 of the pin 28. When the wedge 46 is inserted into the elongate slot 38, the concave end 42b of the elongate slot 38 is configured to engage the lower surface 50. Because of the increasing width of the wedge 46, the farther the wedge 46 is inserted through the pin 28, the closer the upper surface 48 moves toward the bottom side 34 of the head 30 of the pin 28. In this regard, the wedge 46 may be hammered into the elongate slot 38 until the corresponding flanges 16, 20 of the lid 22 and the steel pot 12 are tightly gripped between the wedge 46 and the head 30 of the pin 28. The upper surface 48 has a generally planar contour to cleanly engage with one of the flanges 16, 20, while the lower surface 50 defines a convex contour configured to slide against the corresponding concave end 42b of the elongate slot 38.

Figure 6:
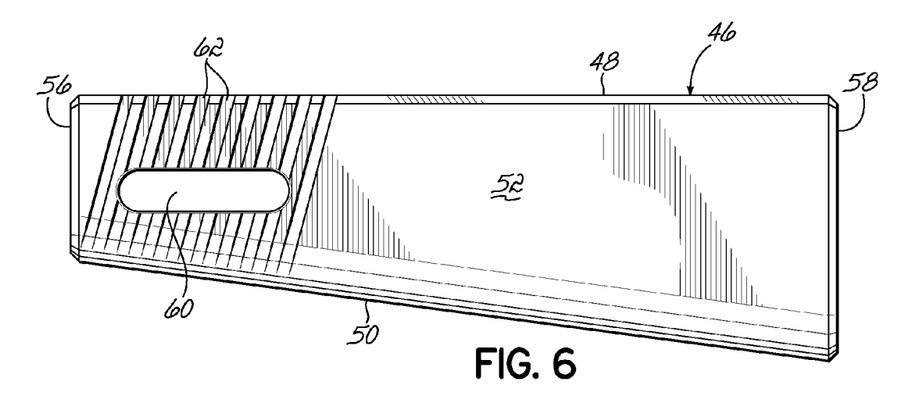
FIG. 6 is a side elevation view of a wedge of the wedge fastener of FIG. 2.

The wedge 46 further includes a longitudinal slot 60 extended between the first and second side surfaces 52, 54 adjacent to the small end surface 56. The wedge 46 also includes a first plurality of angled slots 62 formed in the first side surface 52 around the longitudinal slot 60, and a second plurality of angled slots 64 formed in the second side surface 54 around the longitudinal slot 60. Each of the angled slots 62, 64 runs generally parallel to the other slots 62, 64 and extends from the upper surface 48 to the lower surface 50. The angled slots 62, 64 may be disposed at any angle from the upper surface 48 within the scope of this invention, but the illustrated embodiment angles the slots 62, 64 at about 75 degrees from the upper surface 48.

Figure 2:
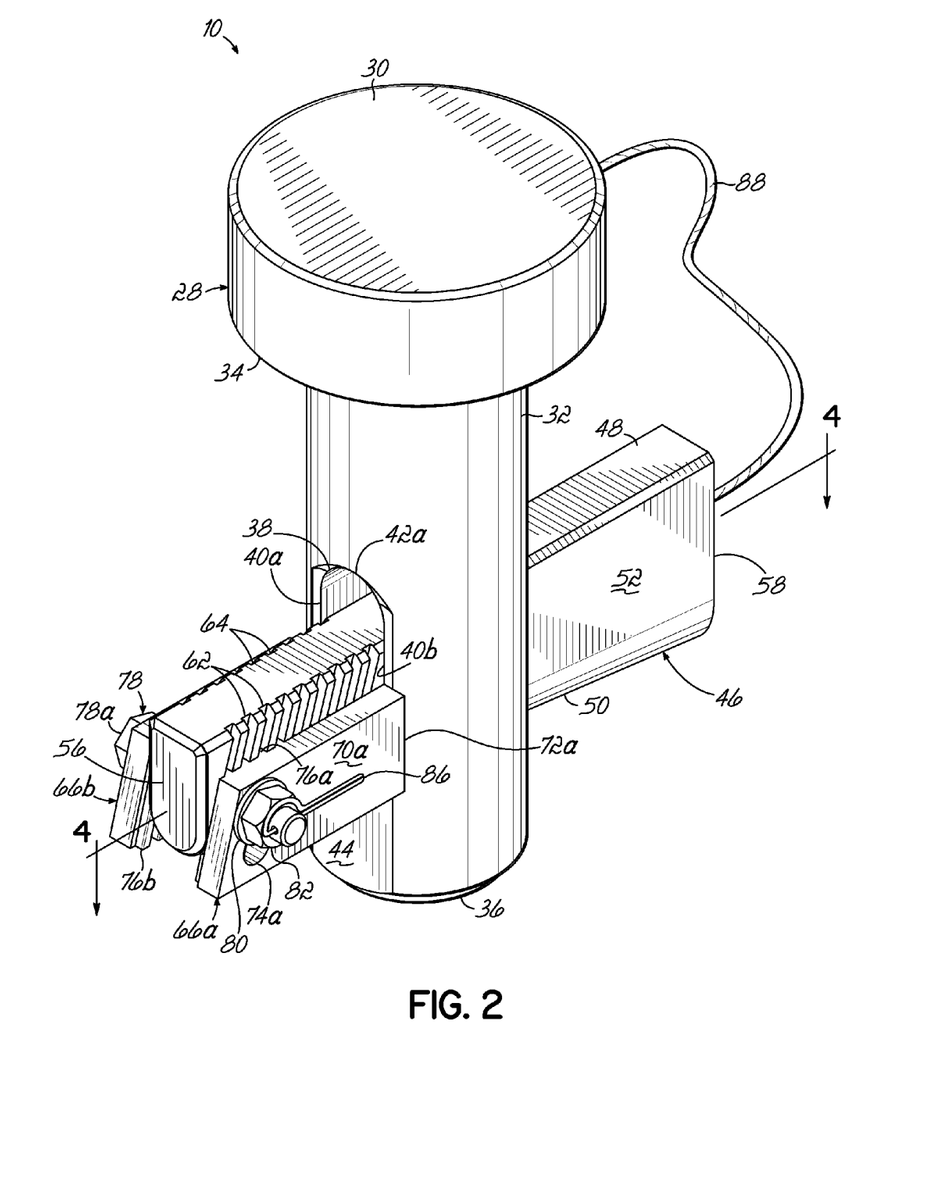
FIG. 2 is a perspective view of the first embodiment of the wedge fastener of FIG. 1.
Figure 7:
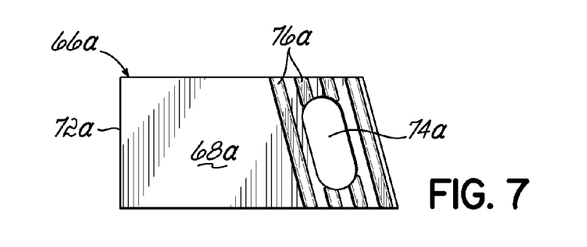
FIG. 7 is a side elevation view of a locking key of the wedge fastener of FIG. 2.

With reference to FIGS. 2 and 7, the wedge fastener 10 further includes a pair of locking keys 66a, 66b configured to engage the wedge 46 and the pin 28. The first locking key 66a is a mirror image of the second locking key 66b, so only the first locking key 66a is described in detail below (e.g., each corresponding element of the second locking key 66b includes the same reference numeral with a "b"). The first locking key 66a includes an inner surface 68a facing the wedge 46, and outer surface 70a facing away from the wedge 46, and an end surface 72a facing toward the shank 32 of the pin 28. The first locking key 66a also includes a transverse slot 74a cut through the locking key 66a extending between the inner surface 68a to the outer surface 70a. The first locking key 66a also includes a plurality of angled ridges 76a surrounding the transverse slot 74a and generally parallel to the transverse slot 74a. The angled ridges 76a are sized to slidingly engage the first plurality of angled slots 62 on the first side surface 52 of the wedge 46.

Thus, the first locking key 66a is engaged with the wedge 46 so that the angled ridges 76a sit in the first angled slots 62, and then the first locking key 66a may be slid upwardly in the first angled slots 62 until the end surface 72a abuts the shank 32 along the planar surface 44. In a similar manner, the second locking key 66b is engaged with the wedge 46 so that the angled ridges 76b sit in the second angled slots 64, and then the second locking key 66b may be slid upwardly in the second angled slots 64 until the end surface 72b abuts the shank 32 along the planar surface 44. In this position, the locking keys 66a, 66b bear against the shank 32 and prevent the wedge 46 from sliding back out of the elongate slot 38 in the shank 32.

Figure 3:
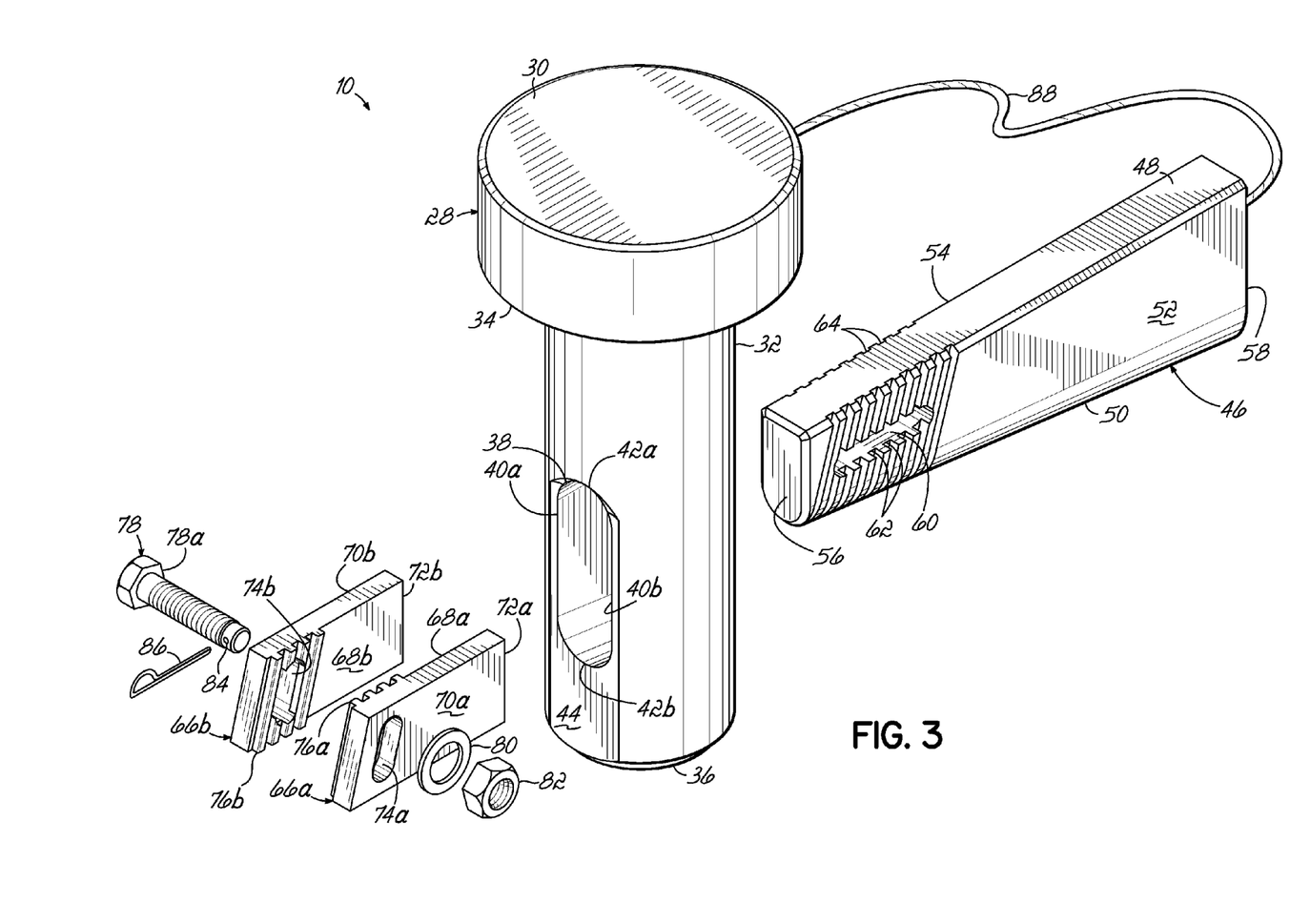
FIG. 3 is a perspective exploded view of the wedge fastener of FIG. 2.
Figure 4:
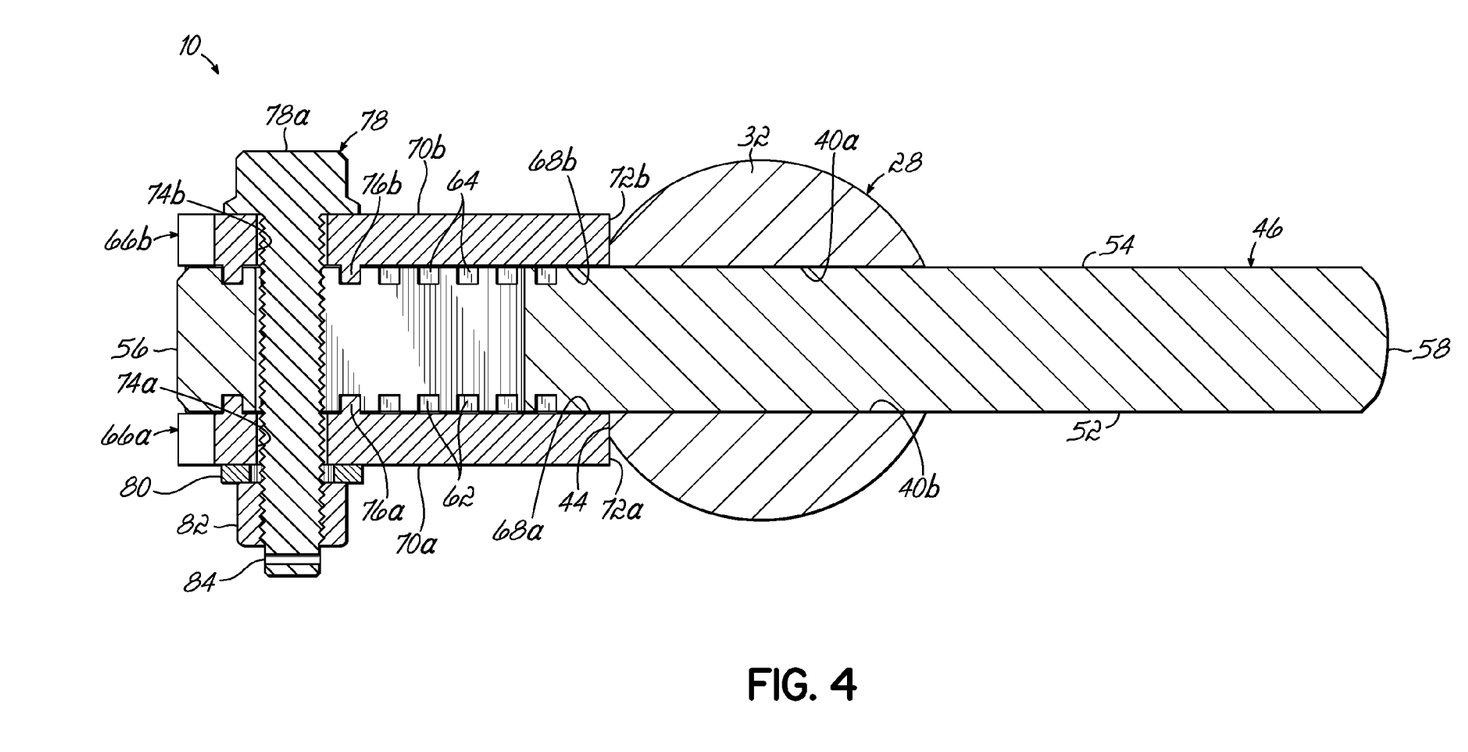
FIG. 4 is a top cross-sectional view of the wedge fastener of FIG. 2 taken along lines 4-4.
Figure 5:
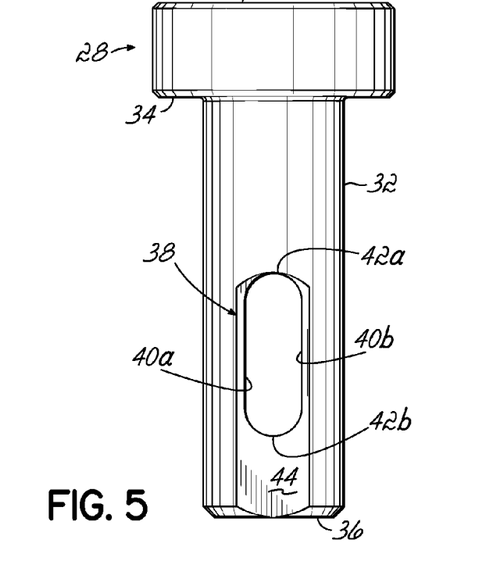
FIG. 5 is a front elevation view of a pin of the wedge fastener of FIG. 2.

With reference to FIGS. 2 and 3, the wedge fastener 10 also includes a locking bolt 78 inserted through the transverse slots 74a, 74b of the locking keys 66a, 66b and the longitudinal slot 60 of the wedge 46. The longitudinal slot 60 and the transverse slots 74a, 74b will be in registration because the angled slots 62, 64 and angled ridges 76a, 76b are positioned around the longitudinal slot 60 and transverse slots 74a, 74b (see FIG. 4). The locking bolt 78 may include a standard size threaded bolt 78 (such as a ⅝" bolt) with a head 78a configured to be tightened with a washer 80 and a threaded locking nut 82 as understood in the art. The locking bolt 78 tightly grips the locking keys 66a, 66b to the wedge 46 between the head 78a and the locking nut 82 such that the locking keys 66a, 66b will not slide and release the wedge 46. The locking bolt 78 may also include an aperture 84 for a cotter pin 86 to further ensure that the locking nut 82 does not back off locking bolt 78. Thus, the wedge fastener 10 reliably grips the top and bottom edge flanges 16, 20 together.

In operation, the wedge fastener 10 is applied to the flanges 16, 20 as follows. The shank 32 of the pin 28 is inserted through apertures (not shown) in both flanges 16, 20 so that the head 30 of the pin 28, and more specifically, the bottom side 34 of the head 30 engages the flange 20 on the lid 22. To accommodate flanges 20 of different thicknesses, a washer (not shown) may be placed between the head 30 and the flange 20 as understood in the art. The small end surface 56 of the wedge 46 is then inserted through the elongate slot 38 in the shank 32 until the wedge 46 with its increasing cross-section engages and grips the flange 16 on the pot 12. As shown in FIG. 2, the locking keys 66a, 66b are then engaged with the wedge 46 by inserting the respective locking ridges 76a, 76b into the corresponding first and second pluralities of angled slots 62, 64. The locking keys 66a, 66b are then slid upwardly in the angled slots 62, 64 so that the end surfaces 72a, 72b move into engagement with the planar surface 44 on the shank 32, thereby forcing the wedge 46 to tighten the grip of the flanges 16, 20 between the head 30 of the pin 28 and the upper surface 48 of the wedge 46. The locking bolt 78 is then inserted through the wedge 46 and the locking keys 66a, 66b and tightened to lock the locking keys 66a, 66b and the wedge 46 in the tightly gripping position.

The elements of the wedge fastener 10 do not fuse together or corrode to the extent that the wedge fastener 10 cannot be removed from the flanges 16, 20. If any elements were to fuse, however, it would be the threaded bolt 78 and locking nut 82. But, because those two elements are relatively small, i.e. ⅝" diameter, the time and energy required to cut the bolt 78 off is significantly less than the time and energy required to cut a 4" diameter or larger threaded conventional bolt typically used in these applications. The wedge fastener 10 is also completely adjustable for tolerance variances in the flanges 16, 20 because the locking keys 66a, 66b slide along the angled slots 62, 64 to adjust the distance between the wedge 46 and the head 30 of the pin 28 by at least 0.25 inches. The angle of the angled slots 62, 64 and angled ridges 76a, 76b as well as the number of angled slots 62, 64 may be modified in accordance with this invention to provide even more adjustability for the wedge fastener 10. As a result, the wedge fastener 10 is configured to reliably hold any two flanges together without requiring excessive downtime every time the wedge fastener 10 is to be removed from the flanges.

Typically the top edge flange 16 of a steel pot 12 is positioned well above a floor of a steel mill. Consequently, it is desirable to minimize the number of loose parts that need to be assembled to form the wedge fastener 10. In this regard, the wedge fastener includes a wire or cable 88 welded or otherwise attached to the head 30 of the pin 28 and the large end surface 58 of the wedge 46. The wedge 46 is always held within close proximity to the pin 28 because of the cable 88. Furthermore, when the wedge fastener 10 is disassembled, a worker can focus on holding the locking bolt 78 and locking keys 66a, 66b only because even if the wedge 46 is forced out of the shank 32, the wedge 46 will not fall away from the pin 28 toward the steel mill floor.

Figure 8:
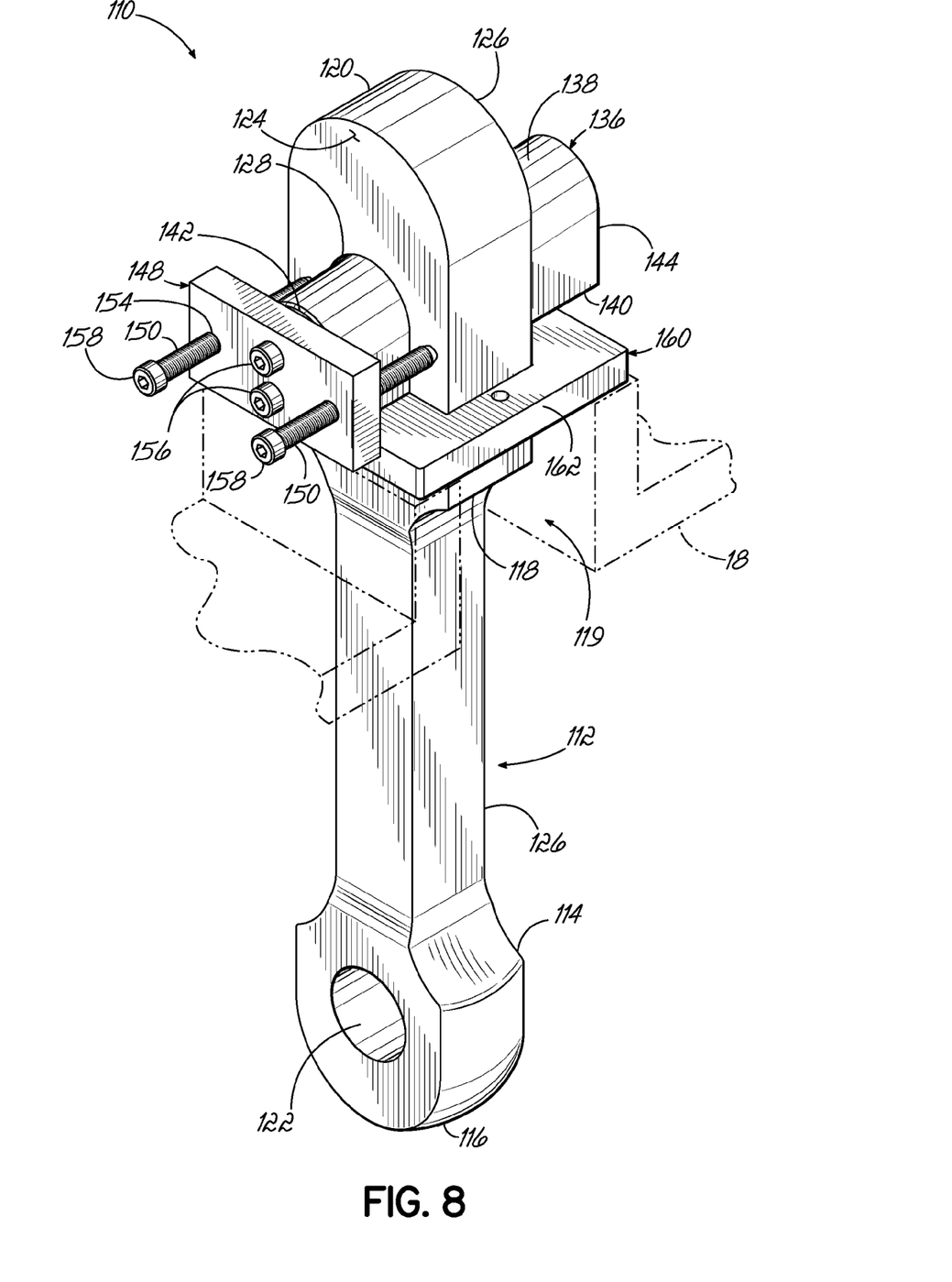
FIG. 8 is a perspective view of the second embodiment of the wedge fastener of FIG. 1.
Figure 9:
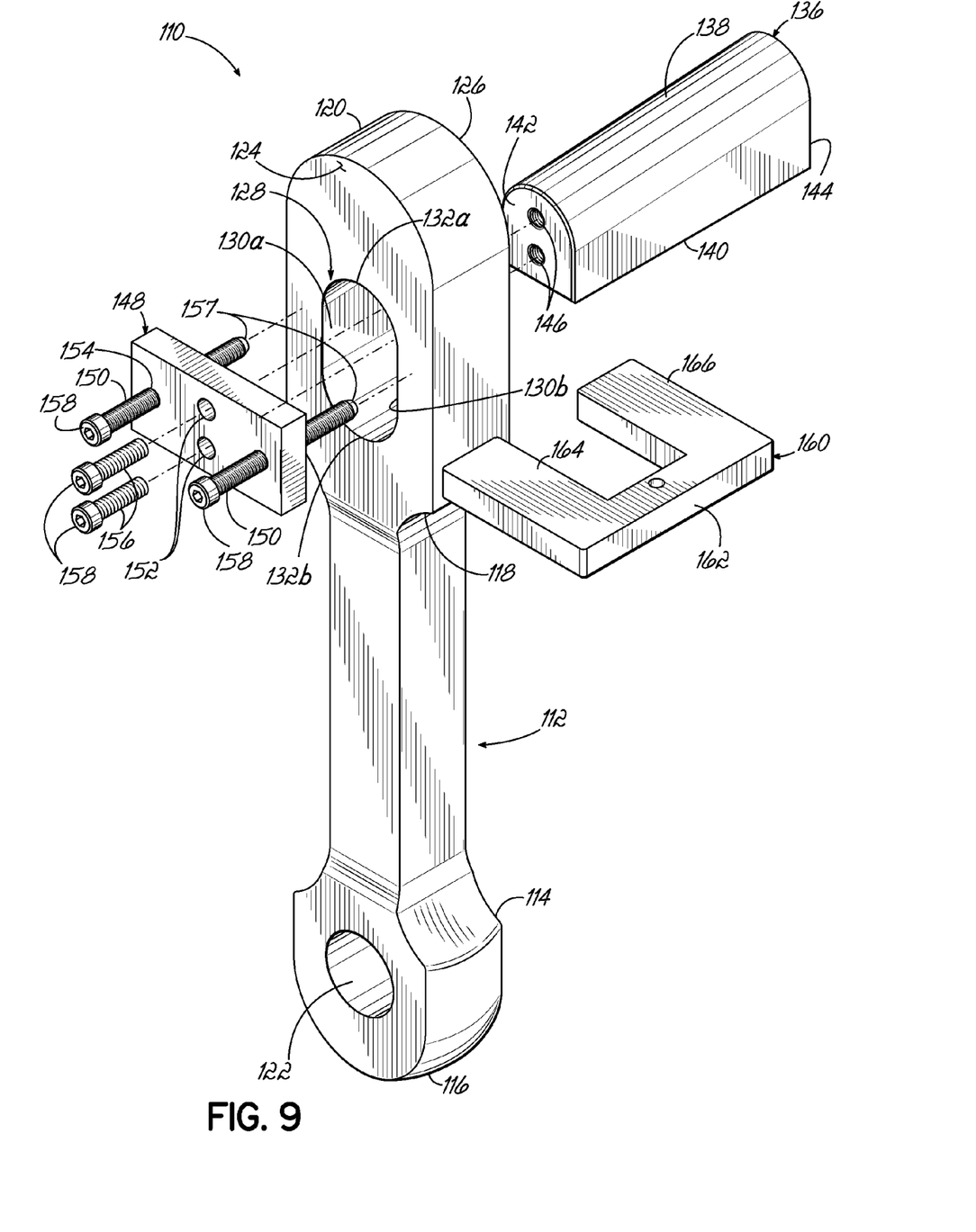
FIG. 9 is a perspective exploded view of the wedge fastener of FIG. 8.
Figures 10, 11, 12:
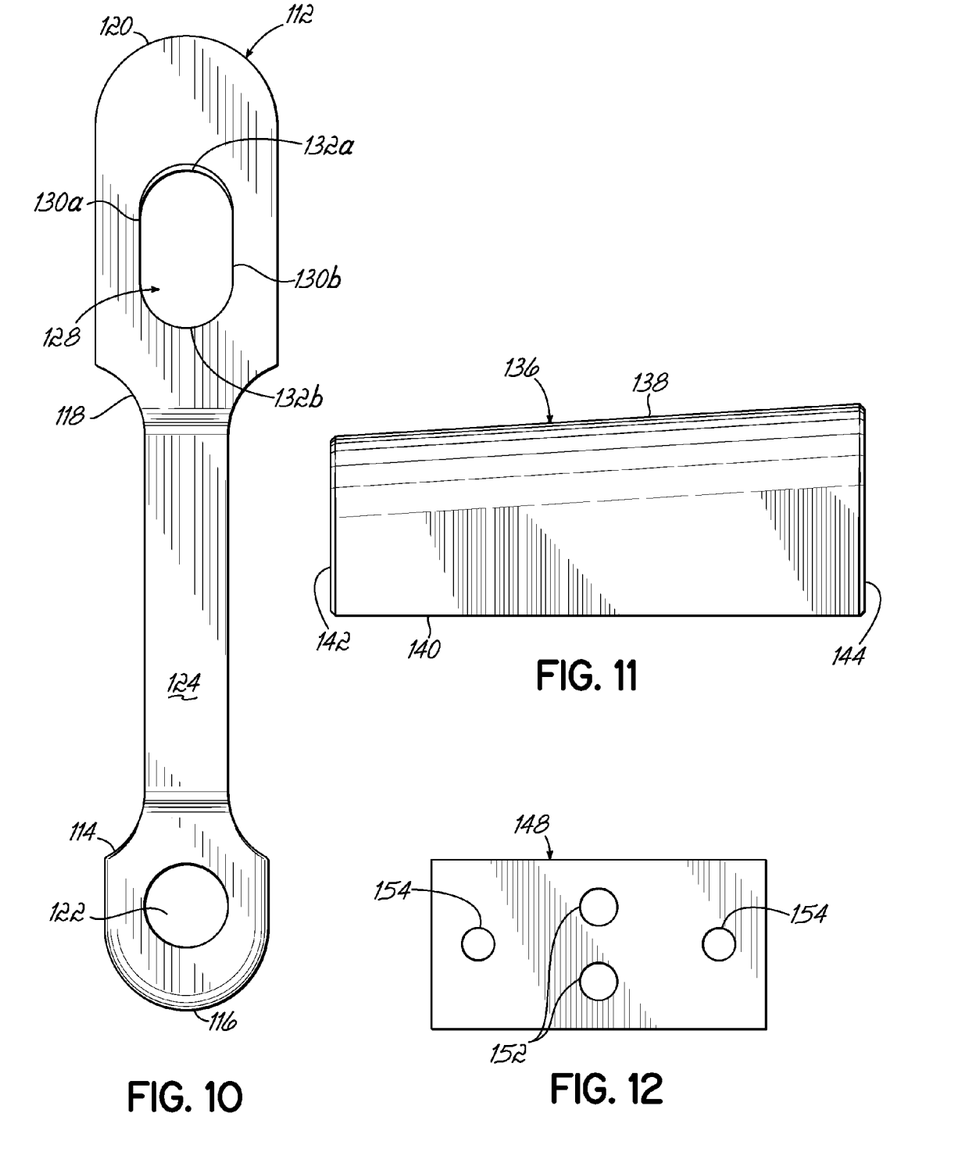
FIG. 10 is a front elevation view of a swing bolt of the wedge fastener of FIG. 8.
FIG. 11 is a side elevation view of a wedge of the wedge fastener of FIG. 8.
FIG. 12 is a front elevation view of a jack plate of the wedge fastener of FIG. 8.

FIGS. 8-12 illustrate additional details of the wedge fastener 110 of the second embodiment. The wedge fastener 110 includes a swing bolt 112 having a head 114 at a first end 116 and a shank 118 extending from the head 114 to a second end 120. The head includes an aperture 122 configured to receive a pin, bolt, or other similar connector on the support member or cradle 24. In this regard, the swing bolt 112 is pivotally coupled to the support cradle 24 such that the shank 118 can pivot into a slot 119 in the slotted support flange 18 of the steel pot 12. The swing bolt 112 includes a first side 124 and a second side 126. An elongate slot 128 is formed through the swing bolt 112 from the first side 124 to the second side 126 adjacent to the second end 120 of the swing bolt 112. The elongate slot 128 is defined by generally parallel sidewalls 130a, 130b and top and bottom concave ends 132a, 132b, as shown in FIG. 10.

The wedge fastener 110 also includes a wedge 136 as shown in FIGS. 8, 9, and 11. The wedge 136 includes an upper side surface 138 and a lower side surface 140. The wedge 136 widens in cross section along a longitudinal length from a first end surface 142 to a second end surface 144 as the upper side surface 138 and lower side surface 140 diverge. The upper side surface 138 defines a generally convex contour configured to slide against the top concave end 132a of the elongate slot 128 in the swing bolt 112. The lower side surface 140 defines a generally planar contour for engaging and gripping the slotted support flange 18 of the steel pot 12. As the wedge 136 is inserted farther into the elongate slot 128, the lower side surface 140 clamps downwardly toward the head 114 of the swing bolt 112. The wedge 136 further includes a pair of threaded bores 146 extending inwardly from the first end surface 142.

The wedge fastener 110 further includes a jack plate 148 and a pair of adjustment bolts 150 as shown in FIGS. 8 and 9. The jack plate 148 is formed as a rectangular plate, but it will be appreciated that the jack plate 148 may be formed in any size within the scope of this invention. The jack plate 148 includes a pair of unthreaded first apertures 152 and a pair of threaded second apertures 154. Once the wedge 136 is slid into the elongate slot 128 in the swing bolt 112, a pair of coupling bolts 156 is inserted through the pair of unthreaded first apertures 152 in the jack plate 148 and engaged with the threaded bores 146 in the wedge 136. Thus, the jack plate 148 is tightly engaged with the first end surface 142 of the wedge 136. The pair of adjustment bolts 150 is threadably engaged with the pair of threaded second apertures 154 in the jack plate such that tightening the adjustment bolts 150 will advance flat free ends 157 of the adjustment bolts 150 toward engagement with the first side 124 of the swing bolt 112. Consequently, the adjustment bolts 150 can be tightened until the wedge 136 is pulled through the elongate slot 128 enough to tightly clamp down on the slotted support flange 18. Each of the adjustment bolts 150 and the coupling bolts 156 includes an allen-wrench socket 158 at their head portions so that the wedge fastener 110 may be assembled and tightened using only one tool. It will be appreciated that the adjustment bolts 150 and the coupling bolts 156 may include hex flanges or other standard fastener shapes in other embodiments within the scope of this invention.

The wedge fastener 110 may also include a generally C-shaped washer 160. The C-shaped washer 160 is configured to slide onto the shank 118 of the swing bolt 112 adjacent to the elongate slot 128 such that the wedge 136 tightens onto the washer 160 rather than directly onto the slotted support flange 18. The washer 160 includes a base 162 and first and second legs 164, 166 extending away from the base 162. The first leg 164 is configured to engage the first side 124 of the swing bolt 112, while the second leg 166 is configured to engage the second side 126 of the swing bolt 112. The washer 160 spreads out the clamping force of the wedge 136. Additionally, the base 162 of the washer 160 may assist in preventing the swing bolt 112 from pivoting out of the slot 119 in the slotted support flange 18 after the wedge fastener 110 has been tightened onto the flange 18.

In operation, the wedge fastener 110 couples the slotted support flange 18 and the support cradle 24 as follows. The head 114 of the swing bolt 112 is pivotally coupled to the support cradle 24. The swing bolt 112 is then pivoted upwardly into the slot 119 on the slotted support flange 18. The C-shaped washer 160 is inserted around the shank 118 of the swing bolt 112 directly above the slotted support flange 18. Then the wedge 136 is inserted through the elongate slot 128 of the shank 118 such that the wedge 136 begins to grip downwardly on the washer 160 and the support flange 18. The jack plate 148 is positioned against the first end surface 142 of the wedge 136 and the coupling bolts 156 are inserted through the jack plate 148 into threaded bores 146 in the wedge 136 to thereby couple the jack plate 148 and the wedge 136. The adjustment bolts 150 carried in the jack plate 148 are then tightened or advanced until the flat free ends 157 of the adjustment bolts 150 engage the first side 124 of the swing bolt 112. The adjustment bolts 150 continue to be tightened to pull the wedge 136 as far as possible through the elongate slot 128, thereby clamping firmly onto the support flange 18. In the tightened position, the washer 160 discourages the shank 118 of the swing bolt 112 from pivoting out of the slot 119 in the support flange 18.

Like the previously-described embodiment, the elements of the wedge fastener 110 do not fuse together or corrode to the extent that the wedge fastener 110 cannot be removed from the flanges 16, 20. If any elements were to fuse, however, it would be threaded coupling bolts 156 and adjustment bolts 150. But, because those two elements are relatively small, the time and energy required to cut any of the bolts 150, 156 off, if necessary, is significantly less than the time and energy required to cut a 4" diameter or larger threaded conventional swing bolt typically used in these applications. As a result, the wedge fastener 110 is configured to reliably hold a flange and a support member together without requiring excessive downtime every time the wedge fastener 110 is to be removed from the flanges.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A fastener configured to couple two flanges together, the fastener comprising:
    a pin including a head and an elongate shank extending from the head to a lower end, the shank including an elongate slot disposed between the head and the lower end;
    a wedge sized so that at least a portion of the wedge may extend through the elongate slot, the wedge including an upper surface configured to face toward the head, a lower surface configured to face away from the head, first and second side surfaces that increase in width as defined between the upper surface and the lower surface along a longitudinal length of the wedge, and a longitudinal slot extending between the first and second side surfaces, the wedge further including a plurality of angled slots formed in at least one of the side surfaces adjacent to the longitudinal slot;
    at least one locking key adapted to engage the wedge when the wedge is inserted through the elongate slot, the locking key including an inner surface facing the wedge, an outer surface, an end surface facing the shank of the pin, and a transverse slot extending between the inner and outer surfaces, the inner surface further including a plurality of angled ridges adjacent to the transverse slot and configured to engage the plurality of angled slots in the at least one side surface of the wedge; and
    a locking bolt inserted through the longitudinal slot of the wedge and the transverse slot of the at least one locking key,
    wherein when at least a portion of the wedge is slid through the elongate slot in the shank, the two flanges are gripped between the head of the pin and the upper surface of the wedge, the at least one locking key is engaged with the at least one side surface of the wedge and slid upwardly until the end surface engages the shank adjacent to the elongate slot, and then the locking bolt is tightened to the wedge and the at least one locking key to hold the wedge in position.

2. The fastener of claim 1, wherein the shank of the pin is generally cylindrical and includes a generally flat surface adjacent to the elongate slot, the flat surface configured to engage the end surface of the at least one locking key.

3. The fastener of claim 1, wherein the wedge includes a plurality of angled slots formed in each of the first and second side surfaces, and the fastener comprises two locking keys adapted to engage the first and second side surfaces of the wedge when at least a portion of the wedge is inserted through the elongate slot.

4. The fastener of claim 1, wherein sliding the locking key upwardly with respect to the wedge is configured to adjust the distance between the head of the pin and the upper surface of the wedge by at least 0.25 inches.

5. The fastener of claim 1, further comprising a cable coupled to the head of the pin and the wedge.

6. The fastener of claim 1, wherein the lower surface of the wedge is convex and configured to slide along a concave edge of the elongate slot.

7. The fastener of claim 1, wherein the locking bolt further includes a head at a first end and a cotter pin at a second end.

8. A fastener configured to couple a slotted flange and a support member, the fastener comprising:
- a swing bolt including a head at a first end configured to pivotally engage the support member, and a shank extending from the head to a second end, the shank including an elongate slot configured to be disposed at least partially above the slotted flange when the shank is inserted into the slotted flange;
- a wedge sized so that at least a portion of the wedge may extend through the elongate slot and including an upper side surface and a lower side surface, the wedge having a width between the upper side surface and the lower side surface that increases from a first end to a second end, the first end including at least one threaded bore;
- a jack plate including at least one threaded coupling bolt configured to engage the at least one threaded bore when at least a portion of the wedge is inserted through the elongate slot in the shank; and
- two adjustment bolts engaged with the jack plate on opposing sides of the wedge and extending to contact the shank on opposite sides of the elongate slot, the two adjustment bolts configured to pull the wedge through the elongate slot until the lower side surface of the wedge urges the slotted flange toward the support member.

9. The fastener of claim 8, further comprising:
- a washer configured to be gripped between the lower side surface of the wedge and the slotted flange, the washer blocking of the shank from pivoting out of the slotted flange when the adjustment bolts are tightened.

10. The fastener of claim 8, wherein the upper side surface of the wedge is convex and configured to slide along a concave edge of the elongate slot.

11. An apparatus for coupling a pot to a lid and a support structure, comprising:
- a plurality of first fasteners for coupling a flange of the lid to a first flange of the pot, each first fastener including:
  - a pin including a head and an elongate shank extending from the head to a lower end, the shank including an elongate slot disposed between the head and the lower end,
  - a wedge sized so that at least a portion of the wedge may extend through the elongate slot, the wedge including an upper surface configured to face toward the head, a lower surface configured to face away from the head, first and second side surfaces that increase in width as defined between the upper surface and the lower surface along a longitudinal length of the wedge, and a longitudinal slot extending between the first and second side surfaces, the wedge further including a plurality of angled slots formed in at least one of the side surfaces adjacent to the longitudinal slot,
  - at least one locking key adapted to engage the wedge when the wedge is inserted through the elongate slot, the locking key including an inner surface facing the wedge, an outer surface, an end surface facing the shank of the pin, and a transverse slot extending between the inner and outer surface, the inner surface further including a plurality of angled ridges adjacent to the transverse slot and configured to engage the plurality of angled slots in the at least one side surface of the wedge, and
  - a locking bolt inserted through the longitudinal slot of the wedge and the transverse slot of the at least one locking key; and
- a plurality of second fasteners for coupling a second flange of the pot to the support structure, each second fastener including:
  - a swing bolt including a head at a first end configured to pivotally engage the support structure, and a shank extending from the head to a second end, the shank including an elongate slot configured to be disposed at least partially above the second flange when the shank is inserted into the second flange,
  - a wedge sized so that at least a portion of the wedge may extend through the elongate slot and including an upper side surface and a lower side surface, the wedge having a width between the upper side surface and the lower side surface that increases from a first end to a second end, the first end including at least one threaded bore,
  - a jack plate including at least one threaded coupling bolt configured to engage the at least one threaded bore when at least a portion of the wedge is inserted through the elongate slot in the shank, and
  - two adjustment bolts engaged with the jack plate on opposing sides of the wedge and extending to contact the shank on opposite sides of the elongate slot, the two adjustment bolts configured to pull the wedge through the elongate slot until the lower side surface of the wedge urges the second flange toward the support structure.

\* \* \* \* \*